United States Patent
Liu et al.

(10) Patent No.: US 12,489,941 B2
(45) Date of Patent: Dec. 2, 2025

(54) METHOD, APPARATUS, ELECTRONIC DEVICE AND STORAGE MEDIUM FOR CONTROLLING MEDIA CONTENT

(71) Applicant: Beijing Zitiao Network Technology Co., Ltd., Beijing (CN)

(72) Inventors: Fujia Liu, Beijing (CN); Siyi Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/949,507

(22) Filed: Nov. 15, 2024

(65) Prior Publication Data
US 2025/0080793 A1    Mar. 6, 2025

Related U.S. Application Data

(63) Continuation of application No. PCT/CN2023/110499, filed on Aug. 1, 2023.

(30) Foreign Application Priority Data

Aug. 2, 2022 (CN) .......................... 202210924898.6

(51) Int. Cl.
*H04N 21/431* (2011.01)
*H04N 21/472* (2011.01)

(52) U.S. Cl.
CPC ... *H04N 21/4316* (2013.01); *H04N 21/47217* (2013.01)

(58) Field of Classification Search
CPC .................. H04N 21/4316; H04N 21/47217
See application file for complete search history.

(56) References Cited

U.S. PATENT DOCUMENTS 8,577,683 B2 * 11/2013 DeWitt ................ G11B 27/034
704/278
2012/0254761 A1   10/2012 Dewitt
(Continued)

FOREIGN PATENT DOCUMENTS

CN    102780921 A    11/2012
CN    104967908 A    10/2015
(Continued)

OTHER PUBLICATIONS

Gao Qiuping et al., "Integration and interaction barrage helps online education in colleges and universities", The Chinese Journal of ICT in Education, Oct. 10, 2021, 6 pages, with English Abstract.
(Continued)

*Primary Examiner* — Thai Q Tran
*Assistant Examiner* — Jose M Mesa
(74) *Attorney, Agent, or Firm* — Astute IP Law Group

(57) ABSTRACT

A method, apparatus, electronic device and a storage medium for controlling media content are provided. In the method, target media content is played in a first region of a media content playback page. In response to a comment display operation for the target media content, comment information of the target media content is displayed in a second region of the media content playback page. In response to a target trigger operation on the media content playback page, the playing of the target media content is paused, and/or the comment information of the target media content is kept displaying.

17 Claims, 6 Drawing Sheets

(56) References Cited

U.S. PATENT DOCUMENTS

| | | | |
|---|---|---|---|
| 2014/0013241 | A1 | 1/2014 | Brown et al. |
| 2014/0068691 | A1 | 3/2014 | Gao et al. |
| 2015/0373395 | A1 | 12/2015 | Schmieder |
| 2017/0229152 | A1 | 8/2017 | Loganathan et al. |
| 2019/0028780 | A1 | 1/2019 | Prabhu et al. |
| 2023/0156283 | A1* | 5/2023 | Zhou ................ H04N 21/44226 725/32 |
| 2023/0254350 | A1* | 8/2023 | Tolle ................ H04N 21/8547 |

FOREIGN PATENT DOCUMENTS

| | | |
|---|---|---|
| CN | 107318038 A | 11/2017 |
| CN | 109474562 A | 3/2019 |
| CN | 109982129 A | 7/2019 |
| CN | 112866815 A | 5/2021 |
| CN | 112969097 A | 6/2021 |
| CN | 113194336 A | 7/2021 |
| CN | 113194349 A | 7/2021 |
| CN | 113905125 A | 1/2022 |
| CN | 113973223 A | 1/2022 |
| CN | 114117282 A | 3/2022 |
| CN | 115314747 A | 11/2022 |
| JP | 2016139934 A | 8/2016 |
| JP | 2022506929 A | 1/2022 |
| WO | 2012137829 A1 | 10/2012 |
| WO | 2019184348 A1 | 10/2019 |

OTHER PUBLICATIONS

International Search Report for PCT/CN2023/110499, mailed on Oct. 20, 2023, 5 pages.
Office Action for Chinese Patent Application No. 202210924898.6, mailed on Jul. 1, 2023, 22 pages.
Notification of Granting Patent Right for Chinese Patent Application No. 202210924898.6, mailed on Feb. 5, 2024, 8 pages.
Extended European Search Report for European Patent Application No. 23849395.1, mailed on Jul. 2, 2025, 10 pages.
Office Action for Japanese Patent Application No. 2024-568267, mailed on Jul. 1, 2025, 17 pages.

* cited by examiner

METHOD, APPARATUS, ELECTRONIC DEVICE AND STORAGE MEDIUM FOR CONTROLLING MEDIA CONTENT

CROSS-REFERENCE TO RELATED APPLICATIONS

This application is a continuation of International Patent Application No. PCT/CN2023/110499, filed on Aug. 1, 2023, which claims the benefit of Chinese Patent Application No. 202210924898.6 filed on Aug. 2, 2022, both of which are incorporated herein by reference in their entireties.

FIELD

The present disclosure relates to the field of computer technologies, and in particular, to a method, apparatus, an electronic device, and a storage medium for controlling media content.

BACKGROUND

When watching a video in a video playback page, a user may view comments of the currently played video by triggering a comment control.

SUMMARY

The present disclosure provides a method, apparatus, an electronic device, and a storage medium for controlling media content, so as to avoid interference caused by playing of video to user watching comment content, which facilitate users' immersive viewing of the comment content.

According to a first aspect, the present disclosure provides a method of controlling media content including:
  playing target media content in a first region of a media content playback page;
  in response to a comment display operation for the target media content, displaying comment information of the target media content in a second region of the media content playback page; and
  in response to a target trigger operation on the media content playback page, pausing the playing of the target media content, and/or keeping displaying the comment information of the target media content.

According to a second aspect, the present disclosure further provides apparatus for controlling media content including:
  a first playing module configured to play target media content in a first region of a media content playback page;
  a comment display module configured to display, in response to a comment display operation for the target media content, comment information of the target media content in a second region of the media content playback page; and
  a playing pausing module configured to, in response to a target trigger operation on the media content playback page, pause the playing of the target media content, and keep displaying the comment information of the target media content.

According to a third aspect, the present disclosure further provides an electronic device, including:
  at least one processor; and
  a memory communicatively connected to the at least one processor, wherein the memory stores a computer program executable by the at least one processor, and the computer program is executed by the at least one processor to enable the at least one processor to perform the foregoing method of controlling media content.

According to a fourth aspect, the present disclosure further provides a computer-readable storage medium having a computer program stored thereon, where the program, when executed by a processor, implements the foregoing method of controlling media content.

According to a fifth aspect, the present disclosure further provides a computer program product, including a computer program that is carried on a non-transitory computer readable medium, where the computer program includes program codes for executing the foregoing method of controlling media content.

DETAILED DESCRIPTION

Figure 1:
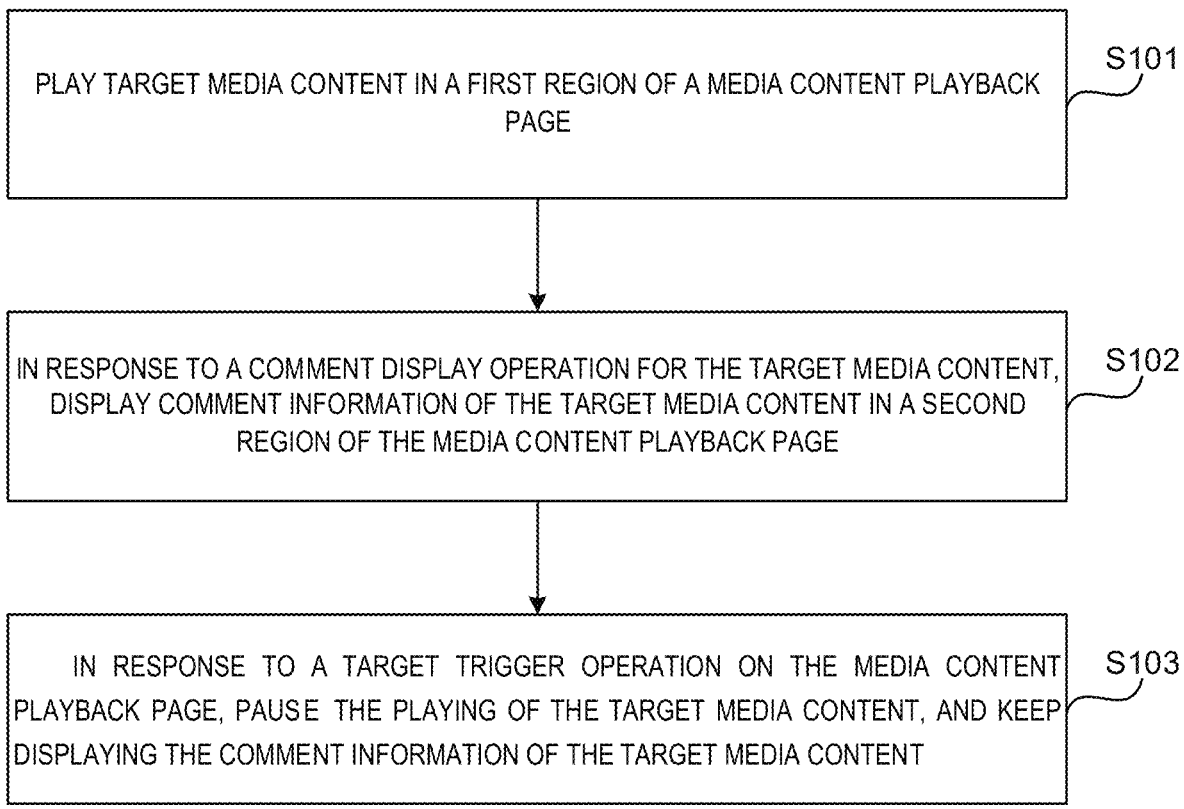
FIG. 1 is a schematic flowchart of a method of controlling media content according to an embodiment of the present disclosure.

Embodiments of the present disclosure will be described below with reference to the accompanying drawings. Although some embodiments of the present disclosure are shown in the accompanying drawings, the present disclosure may be implemented in various forms, and these embodiments are provided for understanding the present disclosure. The drawings and embodiments of the present disclosure are for exemplary purposes only.

The steps recited in the method embodiments of the present disclosure may be performed in different orders, and/or in parallel. Further, the method embodiments may include additional steps and/or omit performing the illustrated steps. The scope of the present disclosure is not limited in this respect.

As used herein, the term "comprising" and deformation thereof are open, i.e., "comprising". The term "based on" is "based at least in part on". The term "one embodiment" means "at least one embodiment"; the term "another embodiment" means "at least one further embodiment"; the term "some embodiments" means "at least some embodiments". The relevant definition of other terms will be given below.

Concept concepts such as "first" and "second" mentioned in this disclosure are merely used to distinguish different apparatuses, modules, or units, and are not intended to limit the order of functions performed by the apparatuses, modules, or units or the mutual dependency relationship.

Modifications to "a" and "a plurality" mentioned in this disclosure are illustrative and not limiting, and those skilled in the art will appreciate that "one or more" should be understood unless specifically stated otherwise.

The names of messages or information interaction between multiple devices in embodiments of the present disclosure are for illustrative purposes only and are not intended to limit the scope of such messages or information.

Before the technical solutions discussed by the embodiment of the present disclosure are used, types, scopes of usage, scenarios of usage and the like of the personal information involved in the disclosure should be informed to the user and obtain the authorization of the user in an appropriate manner according to relevant laws and regulations.

For example, in response to receiving an active request from a user, prompt information is sent to the user to explicitly prompt the user that the requested operation will need to acquire and use the personal information of the user. Therefore, the user can autonomously select whether to provide personal information to software or hardware, such as an electronic device, an application, a server or a storage media, executing the operation of the technical solution of the present disclosure according to the prompt information.

As an implementation, in response to receiving an active request of the user, the manner of sending the prompt information to the user may be, for example, a pop-up window, and the prompt information may be presented in a text manner in the pop-up window. In addition, the pop-up window may further carry a selection control for the user to select "agree" or "disagree" to provide personal information to the electronic device.

The foregoing notification and processes for obtaining user authorization are merely illustrative, without limiting implementations of the present disclosure. Other manners satisfying related laws and regulations may also be applied to implementations of the present disclosure.

FIG. 1 is a schematic flowchart of a method of controlling media content according to an embodiment of the present disclosure. The method may be performed by an apparatus for controlling media content, and the apparatus may be implemented by software and/or hardware, and may be configured in an electronic device, for example, a mobile phone or a tablet computer. The method of controlling media content provided in the embodiments of the present disclosure is applicable to a scenario in which the comment information of the media content is viewed while the media content is played.

When the user views the comment content of the currently played video in an application by triggering the comment control of the video during the video playback process, the application generally continues to play the video when displaying the comment content of the video. It is likely that the playing of the video causes interference to the user to view the comment content of the video, resulting in the user being unable to view the comment content of the video in an immersive manner. At this time, if the user wants to view the comment content of the video in an immersive manner, it is necessary to first instruct the application to cancel the display of the comment content of the video, then execute the trigger operation of pausing the playback of the video in the video playback page, and re-trigger the comment control of the video after pausing the playback of the video to instruct the application to redisplay the comment content of the video. It is rather complicated to pause the playing of the video.

In view of this, the method of controlling media content provided in embodiments of the present disclosure can be used to solve a technical problem that the comment content of the video cannot be viewed in an immersive manner when the comment control is triggered to view the comment content in the foregoing video playback process, as well as a technical problem that the manner in which the video is paused after the comment content of the video is displayed is cumbersome, thereby facilitating the user to view the comment content in an immersive manner.

As shown in FIG. 1, the method of controlling media content provided in this embodiment may include the following steps.

At S101, target media content is played in the first region of the media content playback page.

The media content playback page may be a page for playing media content, such as a video playback page. The first region may be a region in the media content playback page for playing media content, such as a main display region of the media content playback page or a sub-region in the main display region of the media content playback page. For example, the first region may be the main display region of a media content playback page, and the media content playback page may be a playback page of a display region for the media content. The target media content may be currently played media content in the media content playback page, and the media content may be, for example, image-text content or video content. No limitation the type of the target media content is suggested in embodiments of the present disclosure.

Figure 2:
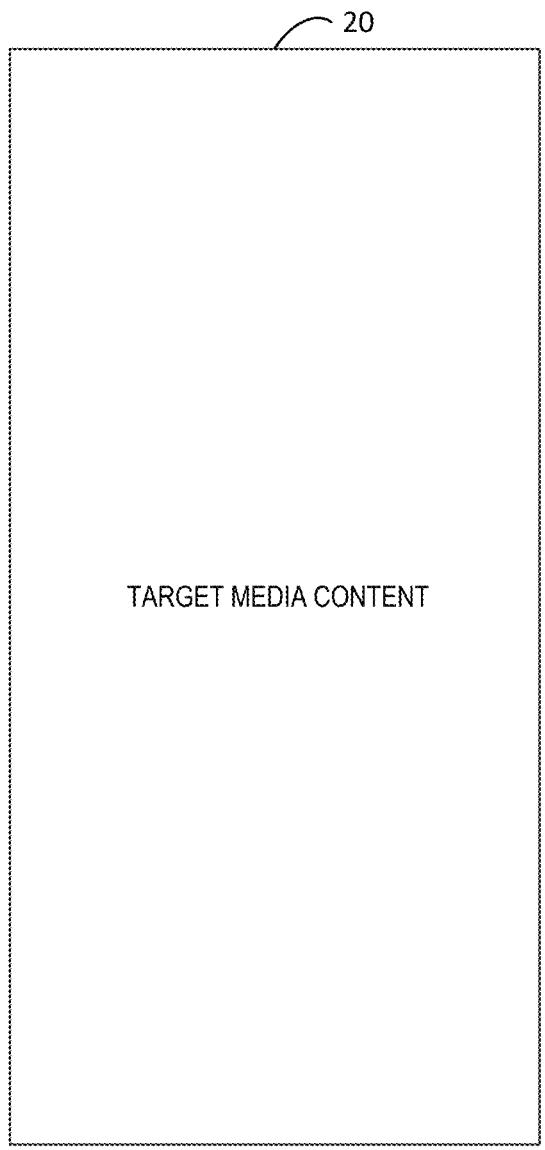
FIG. 2 is a schematic diagram of displaying of a media content playback page according to an embodiment of the present disclosure.

The media content playback page may be displayed, and the target media content may be played in the first region 20 of the media content playback page, as shown in FIG. 2.

At S102, comment information of the target media content is displayed in a second region of the media content playback page in response to a comment display operation for the target media content.

The comment display operation may be a trigger operation for indicating a comment content for displaying the target media content, for example, an operation of triggering a comment control of the target media content. The second region may be a display region of comment information of the target media content. There may be an overlapping region between the second region and the first region, that is, the display of the comment information of the target media content creates an obstruction on the first region. In other words, the present embodiment may control the media content played in the scene in which the main display region is available for playing the media content.

Figure 3:
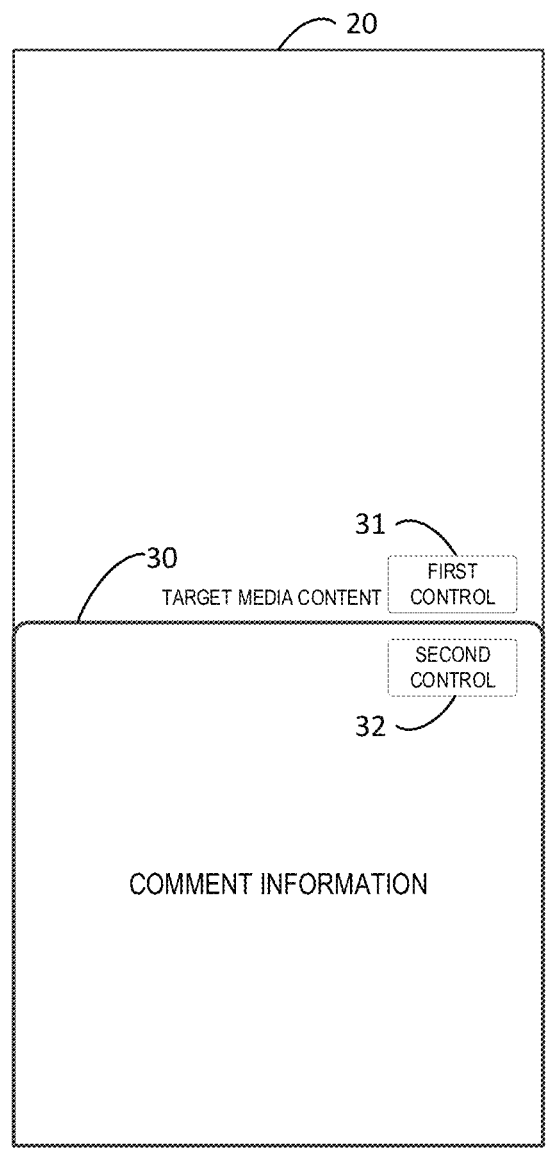
FIG. 3 is another schematic diagram of displaying of a media content playback page according to an embodiment of the present disclosure.

As shown in FIG. 3, during the playing of the target media content (that is, the target media content is currently playing), in response to receiving the comment display operation for the target media content, for example, in response to detecting that the comment control of the target media content displayed in the media content playback page is triggered by the user, the target media content may be kept playing, and the comment information of the target media content is displayed in the second region 30 of the media content playback page, for example, a comment panel of the target media content is displayed in the second region 30 of the media content playback page, and the comment information of the target media content is displayed in the comment panel, so that the user views the comment information of the target media content and/or comment the target media content.

In addition, when the comment information of the target media content is displayed in the second region, the target media content may be played, for example, the target media content is kept playing in the first region. Alternatively, the first region is adjusted based on the second region, to the first region is adjusted to a new area that does not overlap the second region, and the target media content is played in the new area, which may be determined according to a requirement or according to a size of a picture in the target media content, which is not limited in this embodiment.

At S103, in response to a target trigger operation on the media content playback page, the playing of the target media content is paused, and the comment information of the target media content is kept displaying.

The target trigger operation may be a trigger operation used to indicate that the target media content is played while displaying the comment information of the target media content, such as a pause playback operation for the target media content or a region adjustment operation for comment information of the target media content, or the like. The pause operation for the target media content may be a trigger operation for indicating to pause the playing of the target media content, for example, an operation of triggering a pause playback control of the target media content, or an operation of performing a specific gesture (such as double clicking or sliding along a preset direction/preset path) in the media content playback page. The region adjustment operation for the comment information of the target media content may be a trigger operation for indicating to adjust a display region in which the comment information of the target media content is located, for example, an operation of triggering a region adjustment control of the comment information of the target media content, or an operation of performing a preset gesture in the media playback page (for example, double-finger sliding in the second region or single-finger sliding in a preset sub-region of the second region, etc.).

In response to receiving a target trigger operation on the media content playback page, the playback of the target media content may be paused, and the comment information of the target media content may be kept displaying. For example, in response to receiving a pause playback operation for the target media content, the target media content may be paused, and the comment information of the target media content is kept displaying in the second region. Alternatively, in response to receiving the region adjustment operation for the comment information of the target media content, the target media content may be paused, and the display region of the comment information of the target media content is adjusted from the second region to the third region.

In this embodiment, in response to receiving the comment display operation during the playback of the target media content, the comment information of the target media content is displayed, and the target media content is kept playing. In response to receiving the target trigger operation, the playback of the target media content is paused and the comment information of the target media content is kept displaying. The user does not need to exit the view of the comment information to pause the playback of the target media content, and the target media content does not need to be automatically paused when the comment information of the target media content is displayed. Therefore, the user's need for viewing the comment information of the target media content while watching the target media content can be met, and meanwhile the user's need for viewing the comment information of the target media content in an immersive way can be met when the user needs to view the comment information in an immersive way, thereby avoiding the interference of the playback of the target media content to the user' viewing of the comment information of the target media content, which improves the user experience.

In this embodiment, the target trigger operation may be applied to the first control. The first control may be displayed in the media content playback page in a fixed way, and may be displayed when the comment information of the target media content playback page is displayed, for example, when the comment display operation for the target media content is received, so as to avoid blocking the displaying of the target media content by displaying the first control in a fixed way in the media content page while meeting the user's need for pausing the playback of the target media content. In this case, the method of controlling media content provided in this embodiment may further include: in response to a comment display operation for the target media content, displaying a first control in the media content playback page, where the first control is used to trigger execution of the target trigger operation.

The first control may be a control for triggering execution of the target trigger operation. The first control includes a pause playback control and/or a preset adjustment control. The pause playback control may be used to trigger execution of a pause playback operation for the target media content. The preset adjustment control may be used to trigger adjustment of the display of the comment information of the target media content, such as adjusting a display area and/or a display size of the comment information. For example, the preset adjustment control may include a region adjustment control, and the region adjustment control may be used to trigger a region adjustment operation for performing comment information for the target media content.

For example, as shown in FIG. 3, when the comment display operation for the target media content is received, the comment information of the target media content may be displayed in the second region 30 of the media content playback page, and the first control 31 is displayed in the media content playback page, for example, the pause playback control and/or the preset adjustment control is displayed in the media content playback page. This embodiment does not limit the display position of the first control 31 in the media content playback page, for example, the first control 31 may be displayed in the second region 30 or outside the second region 30.

In this embodiment, when the target media content is paused in response to the target trigger operation, the playing control of the target media content may be further displayed, so that the user performs the playback operation for the target media content by triggering the playing control. In this case, the pausing the playing of the target media content in response to a target trigger operation on the media content playback page includes: pausing the playing of the target media content and displaying a playing control in response to the target trigger operation on the pause playback control, where the playing control is used for triggering execution of a playback operation for the target media content.

The display mode and the display timing of the playback control may be flexibly set, for example, the playback control and the pause playback control of the target media content may be displayed simultaneously in response to the comment display operation for the target media content. The playback control of the target media content may also be displayed in response to the target trigger operation, for example, the playback control of the target media content may be displayed and the pause playback control of displaying the target media content is kept; or the playback control of the target media content is displayed and the display of the pause playback control of the target media content is canceled, for example, the pause playback control of the target media content is switched to the playback control of the target media content.

In an implementation, the target trigger operation includes a target gesture operation, and the method further includes: in a triggering process of the target gesture operation, adjusting a region size of the second region and/or a display size of comment information in the second region based on the target gesture operation.

The target trigger operation may include a target gesture operation. The target gesture operation may be used to instruct to adjust a display size of the region size of the second region and/or the comment information displayed in the second region in the trigger process, where the target gesture operation may be, for example, a sliding operation, a stroking operation, a long-press operation, or the like.

In the above implementations, in the triggering process of the target gesture operation, the region size of the second region and/or the display size of the comment information in the second region may be adjusted according to the target gesture operation, for example, the zoom ratio of the second region/comment information is determined based on the sliding distance/continuous click times/length of the target gesture operation, and the comment information displayed in the second region (such as the comment panel) and/or the second region is zoomed according to the zoom ratio to adjust the region size of the second region and/or the display size of the comment information in the second region. Herein, the scaling ratio of the second region and the comment information in the second region may be the same or different, and the second region and the comment information in the second region may be scaled according to the same scaling ratio.

In the above embodiment, the target gesture operation may include a target sliding operation, so that the region size of the second region and/or the display size of the comment information in the second region may be adjusted based on the sliding distance of the target sliding operation, for example, the zoom ratio of the second region/the comment information is determined based on the sliding distance of the target sliding operation, and the comment information displayed in the second region and/or the second region is zoomed based on the zoom ratio. In this case, the target gesture operation includes a target sliding operation, and the adjusting the region size of the second region and/or the display size of the comment information in the second region based on the target gesture operation includes: adjusting the region size of the second region and/or the display size of the comment information in the second region based on the sliding distance of the target sliding operation. The target sliding operation may include an operation of sliding in a preset direction, or a multi-finger sliding operation. The multi-finger swipe operation may include, for example, multi-finger magnification operation and/or multi-finger pinch operation.

According to the method of controlling media content provided in this embodiment, the target media content is played in the first region of the media content playback page; in response to the comment display operation for the target media content, the comment information of the target media content is displayed in the second region of the media content playback page; and in response to the target trigger operation on the media content playback page, the playing of the target media content is paused, and the displaying of the comment information of the target media content is kept. By adopting the technical scheme, in response to receiving the comment display operation in the playing process of the target media content, the comment information of the target media content is displayed and the displaying of the target media content continues, and in response to receiving the target trigger operation, the target media content is played and the comment information of the target media content is kept displayed, so that the interference of the playing of the target media content to the comment information of the user viewing the target media content can be avoided. The diversified requirements of the user in viewing the comment information are met, and the user experience is improved.

Figure 4:
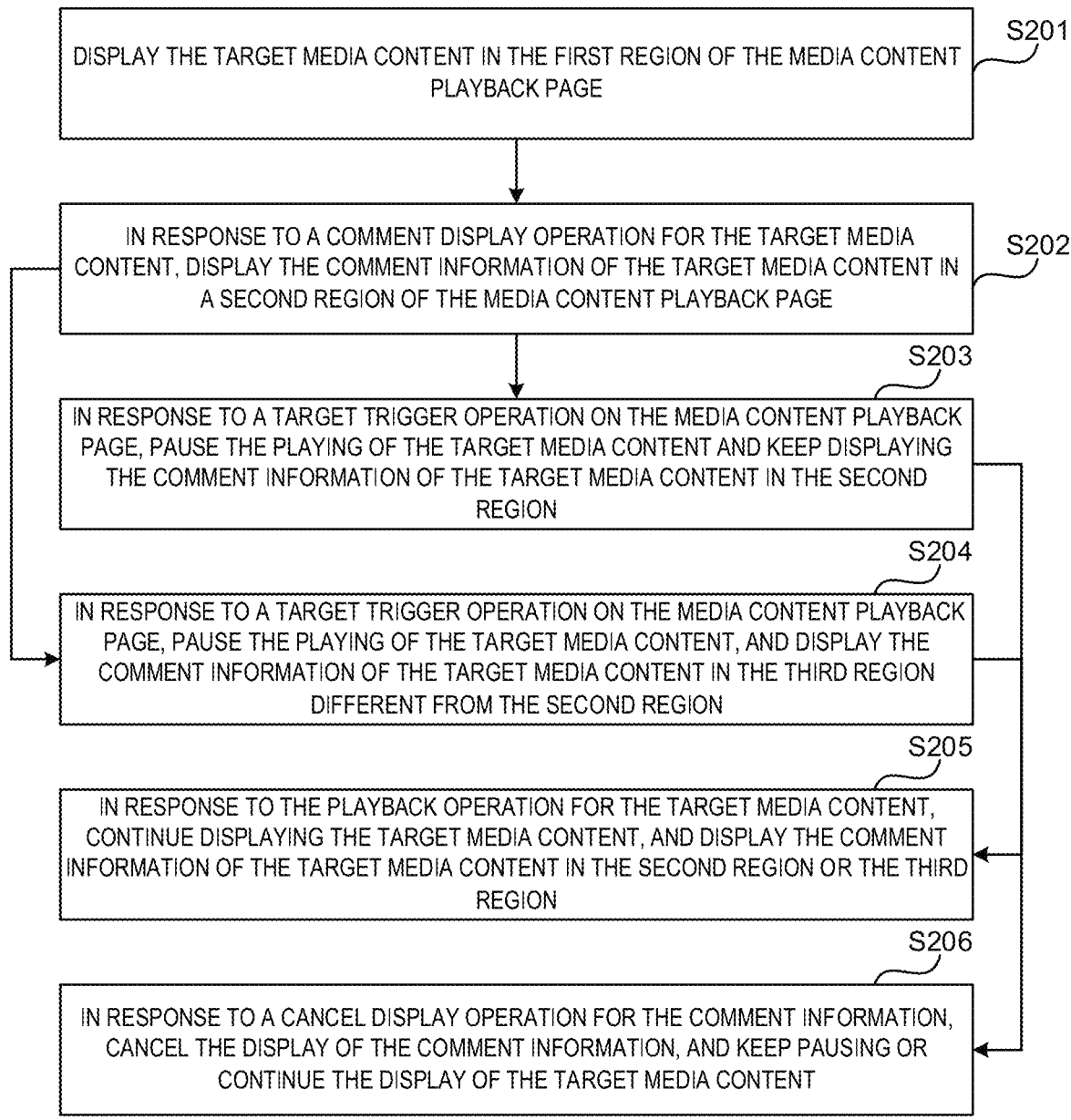
FIG. 4 is a schematic flowchart of another method of controlling media content according to an embodiment of the present disclosure.

FIG. 4 is a schematic flowchart of another method of controlling media content according to an embodiment of the present disclosure. The solution in this embodiment may be combined with one or more of the foregoing embodiments. Keeping displaying the comment information of the target media content includes: keeping displaying the comment information of the target media content in the second region; or displaying comment information of the target media content in a third region, where the third region is different from the second region.

After pausing the playing of the target media content, the method further includes: in response to a playback operation for the target media content, continuing the playing of the target media content, and displaying the comment information of the target media content in the second region or the third region.

After pausing the playing of the target media content and/or keeping displaying the comment information of the target media content, the method further includes: in response to a cancel display operation for the comment information, canceling the displaying the comment information, and keeping pausing the target media content or continuing playing the target media content.

Correspondingly, as shown in FIG. 4, the method of controlling media content provided in this embodiment may include the following steps.

At S201, the target media content is played in the first region of the media content playback page.

At S202, in response to a comment display operation for the target media content, the comment information of the target media content is displayed in a second region of the media content playback page, and S203 or S204 is performed.

At S203, in response to a target trigger operation on the media content playback page, the playing of the target media content is paused and the comment information of the target media content is kept displaying in the second region, and S205 or S206 is performed.

In this embodiment, in response to receiving the target trigger operation, the target media content may be paused, and the comment information of the target media content is kept displaying in the second region.

Taking the target trigger operation as the pause playback operation as an example, if the target trigger operation is the pause playback operation for the target media content, the size of the display region of the comment information and/or the size of the second region/comment information may not be adjusted during the trigger process of the pause playback operation; and when the pause playback operation trigger ends, the playback of the target media content is paused, and the comment information of the target media content is kept displaying in the second region. Alternatively, in the trigger process of the pause playback operation, the region size of the second region and/or the display size of the comment information are adjusted; and when the pause playback operation trigger ends, the playback of the target content is paused, and the second region and/or the comment information is restored to the original size before the pause playback operation is received.

In this embodiment, after the target media content is paused, the user may further adjust the display area of the comment information of the target media content through the region adjustment operation. In this case, after keeping displaying the comment information of the target media content in the second region, the method further includes: adjusting the second region to be a third region in response to an area adjustment operation on the media content playback page, and displaying the comment information of the target media content in the third region. For example, in response to receiving the region adjustment operation in the media content playback page, the comment information of the target media content may be adjusted to the third region for display. In the case where the second region is adjusted to the third region, the comment information of the target media content is displayed in the third region.

At S204, in response to a target trigger operation on the media content playback page, the playing of the target media content is paused, and the comment information of the target media content is displayed in the third region different from the second region. Then, S205 or S206 is performed.

The third region and the second region may be different regions, for example, the third region and the second region may have different display positions and/or region size. For example, the region size of the third region may be greater than the region size of the second region. For instance, the second region may be a display area of the comment information when the comment information is displayed in the half screen, and the third region may be a display area of the comment information when the comment information is displayed in full screen. The third region and the first region may be the same or different regions.

In this embodiment, when the target trigger operation is received, the target media content may be paused, and the comment information of the target media content may be adjusted to the third region for display.

In an implementation, when the target trigger operation is an area adjustment operation, the comment information of the target media content is adjusted to the third region for display, that is, the target media content may be paused when the display area of the comment information is adjusted. At this time, in response to a target trigger operation on the media content playback page, pausing the playing of the target media content, and/or keeping displaying the comment information of the target media content includes: in response to an area adjustment operation on the media content playback page, adjusting a display area of the comment information from the second region to a third region, and pausing the playing of the target media content.

Figure 5:
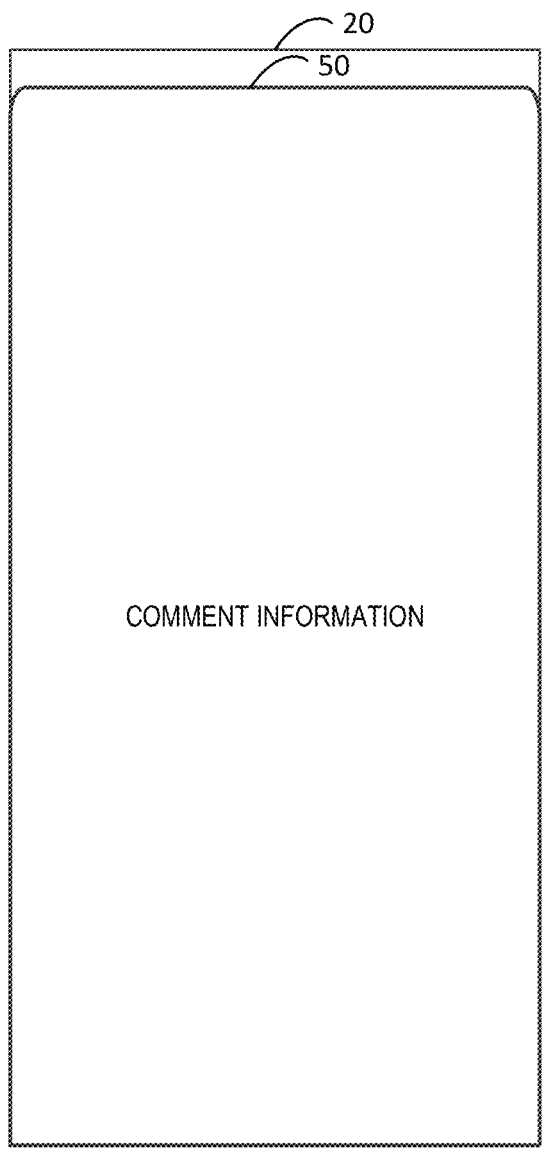
FIG. 5 is still another schematic diagram of displaying of a media content playback page according to an embodiment of the present disclosure.

For example, when a region adjustment operation on the media content playback page is received, the size of the comment information and/or the size of the comment information of the second region 30/may not be adjusted during the trigger process of the region adjustment operation, or the display size of the region size and/or the comment information of the second region 30 may be adjusted during the trigger process of the region adjustment operation. When the region adjustment operation trigger ends, the playback of the target media content is paused, and the comment information of the target media content is displayed in the third region 50, for example, the second region 30 (as shown in FIG. 3) is adjusted to the third region 50, and the comment information of the target media content is displayed in the third region 50, as shown in FIG. 5.

In the foregoing implementation, the adjustment manner of adjusting the second region to the third region may be flexibly set, for example, the second region may be adjusted to the third region by zooming the second region. The second region may be expanded to be the third region, that is, the region size of the second region may be expanded so as to obtain the third region. In this case, in response to a region adjustment operation on the media content playback page, adjusting the display region of the comment information from the second region to the third region, and pausing the playing of the target media content includes: in response to the region adjustment operation on a preset adjustment control, expanding the second region to be the third region, and pausing the playing of the target media content.

In this embodiment, the information display manners of the second region and the third region may be the same or different. The information display manner of the second region is different from the information display manner of the third region. That is, information may be displayed in the third region in an information display manner different from the information display manner of the second region. The information display manner may include, for example, a display size (for example, a font size and so on) of the information, a display style (for example, a color or a font, or the like) of the information, a manner of sorting the displayed information and/or information, and the like. The information includes comment information of the target media content.

In this embodiment, a first predetermined number of pieces of first comment information and m pieces of sub-comment information of the first comment information are displayed in the second region, and a second predetermined number of pieces of second comment information and n pieces of sub-comment information of the second comment information are displayed in the third region. The first predetermined number is different from the second predetermined number, and/or m≠n, and both m and n are positive integers. That is, the number of pieces of the first comment information displayed in the second region is different from the number of pieces of the second comment information displayed in the second region, and/or the number of pieces of sub-comment information of each piece of first comment information displayed in the second region is different from the number of pieces of sub-comment information of each piece of second comment information displayed in the second region.

The first comment information may be comment information that automatically expands and displays at least one piece of sub-comment information in the second region, the second comment information may be comment information that automatically expands and displays at least one piece of sub-comment information in the third region, and the first comment information and the second comment information may be same or different comment information of the target media content.

The first predetermined number may be a predetermined display number of pieces of the first comment information. The second predetermined number may be a predetermined display number of pieces of the second comment information. The first predetermined number and the second predetermined number may both be set as needed, and no limitations are suggested to the first predetermined number and the second predetermined number of numerical values in the embodiments. For example, when the region size of the third region is larger than the region size of the second region, the second predetermined number may be larger than the first predetermined number. When the number of pieces of the comment information of the target media content that includes the sub-comment information is greater than or equal to the first predetermined number/the second predetermined number, the number of pieces of the first comment information/the second comment information displayed in the second region/the third region may be equal to the first predetermined number/the second predetermined number; and when the number of pieces of the comment information of the target media content that includes the sub-comment information is less than the first predetermined number/the second predetermined number, the number of pieces of the first comment information/the second comment information displayed in the second region/the third region may be less than the first predetermined number/the second predetermined number.

m may be a predetermined display number of pieces of sub-comment information of each piece of first comment information, n may be a predetermined display number of pieces of sub-comment information of each piece of second comment information. Both m and n may be set as needed, and the values of m and n are not limited in this embodiment. For example, when the region size of the third region is larger than the region size of the second region, n may be larger than m. For each piece of first comment information, when the number of pieces of sub-comment information included in the first comment information is greater than or equal to m, m pieces of sub-comment information of the first comment information may be displayed; and when the number of pieces of sub-comment information included in the first comment information is less than m, the number of pieces of sub-comment information of the displayed first comment information may be less than m. For each piece of second comment information, when the number of pieces of sub-comment information included in the second comment information is greater than or equal to n, n pieces of sub-comment information of the second comment information may be displayed; and when the number of pieces of sub-comment information included in the second comment information is less than n, the number of pieces of sub-comment information of the displayed second comment information may be less than n.

In this embodiment, ranking orders of the comment information of the target media content are different with respect to displaying in the second region and displaying in the third region. That is, when the comment information of the target media content is displayed in the second region and the third region, the comment information of the target media content may be sorted in different sorting manners. For example, when the comment information is displayed in the second region, the plurality of pieces of comment information of the target media content may be sorted according to the popularity of the plurality of pieces of comment information; and when the comment information is displayed in the third region, the plurality of pieces of comment information of the target media content may be sorted according to the popularity of the plurality of pieces of comment information and the value assessment value of the plurality of pieces of comment information. In addition, the weight of the sorting of the comment information of a specific type (for example, comment information including only @ content and/or comment information only including the sticker) may be reduced, or a specific type of comment information may be arranged at the end of the sorting result, and so on.

In an implementation, after displaying the comment information of the target media content in the second region of the media content playback page, the method further includes: in response to a sub-comment information viewing operation in the second region, adding a third predetermined number of pieces of target sub-comment information to the second region; and/or after displaying the comment information of the target media content in the third region, the method further includes: in response to a sub-comment information viewing operation acting in the third region, adding a fourth predetermined number of pieces of target sub-comment information to the third region, where the target sub-comment information is sub-comment information of third comment information for the sub-comment information viewing operation, and the third predetermined number is different from the fourth predetermined number.

In the above embodiment, in response to receiving the sub-comment information viewing operation, the number of pieces of sub-comment information added to be displayed in the second region may be different from the number of pieces of sub-comment information displayed in the third region. For example, in response to receiving, in the second region, the sub-comment information viewing operation for the piece of comment information displayed in the second region, the third predetermined number of pieces of sub-comment information may be added for the comment information; and in response to receiving, in the third region, the viewing operation for the sub-comment information of the piece of comment information displayed in the third region, the fourth predetermined number of pieces of sub-comment information may be added for the comment information.

The sub-comment information viewing operation may be an operation of viewing sub-comment information of the comment information, which may be used to indicate to add sub-comment information for displaying the corresponding comment information. The third comment information may be comment information for the sub-comment information viewing operation. The target sub-comment information may be sub-comment information added to the sub-comment information viewing operation, and may be sub-comment information of the third comment information.

The third predetermined number may be a predetermined number of pieces of target sub-comment information added to the sub-comment information viewing operation in the second region. The fourth predetermined number may be a predetermined number of target sub-comment information added to the sub-comment information viewing operation in the third region. The third predetermined number and the fourth predetermined number may both be set as needed, and no limitations are suggested to the third predetermined number and the fourth predetermined number of numerical values in the embodiments. For example, when the region size of the third region is larger than the region size of the second region, the fourth predetermined number may be larger than the third predetermined number. When the number of pieces of sub-comment information that has not been displayed by the third comment information is greater than or equal to the third predetermined number/the fourth predetermined number, the third predetermined number/the fourth predetermined number of pieces of target sub-comment information may be added in the second region/third region; when the number of pieces of sub-comment information that has not yet been displayed by the third comment information is less than the third predetermined number/ fourth predetermined number, the number of pieces of target comment information added in the second region/third region may be less than the third predetermined number/fourth predetermined number.

In an implementation, the displaying comment information of the target media content in a third region includes: in response to a completion of triggering of the target trigger operation, adjusting the second region to be the third region based on a preset region size of the third region, and displaying the comment information of the target media content in the third region based on a target display size, wherein the target display size is a first display size of the comment information before the target trigger operation is triggered, a second display size of the comment information at the completion of the triggering of the target trigger operation, or a preset third display size.

In the above embodiment, the region size (i.e., the preset region size) of the third region may be preset. Therefore, after a completion of the triggering of the target trigger operation, the region size of the second region may be adjusted according to the preset region size of the third region, to obtain the third region whose region size matches the preset region size. The comment information of the target media content may be displayed in the third region based on the first display size of the comment information in the second region before the target trigger operation is received, the second display size in the second region of the comment information upon the completion of the triggering of the target trigger operation, or the third display size of the comment information in the third region. The first display size may be a display size of the comment information before the triggering of the target trigger operation; the second display size may be a display size of the comment information at an instant upon the completion of the triggering of the target trigger operation (for example, before the second region is adjusted to be the third region), and may be determined based on the target trigger operation; and the third display size may be a preset display size of the comment information. The third display size may be the same as or different from the first display size/second display size.

In an implementation, the second region further displays a second control, and the displaying the comment information of the target media content in the third region includes: displaying the comment information of the target media content in a third region, and canceling displaying of the second control.

In the foregoing implementation manner, as shown in FIG. 3, when the comment information of the target media content is displayed in the second region 30, the second control 32 may be further displayed in the second region 30, for example, a place control corresponding to a place associated with the target media content, a comment list control, and/or a like list control may be displayed. After the second region 30 is adjusted to be the third region 50, the second control 32 may be stopped to be displayed, so as to present more comment information to the user, as shown in FIG. 5. The second control 32 may be a control displayed in the second region 30 but not displayed in the third region 50, The place control may be used to trigger display of detailed information of the corresponding place; the comment list control may be used to trigger display of comment information of the target media content in the second region 30; and the like list control may be used to trigger a liking user list displaying the target media content in the second region 30.

The comment information of the target media content and user information of the user who like the target media content included in the liking user list are all displayed on the premise that the publisher of the target media content and the user authorized to display the comment/like are authorized to be displayed. If the corresponding user does not perform authorization, the corresponding comment information of the target media content or the user information of the corresponding user performing the like is not displayed.

At S205, in response to the playback operation for the target media content, the target media content is continued to be played, and the comment information of the target media content is displayed in the second region or the third region. Then, the process ends.

The playback operation may be a triggering operation for indicating to continue playing the target media content, that is, the target media content is switched from the paused playing state to the playing state triggering operation, for example, triggering an operation of a playing control displayed in the media content playback page or a preset gesture operation.

When the playback operation for the target media content is received, for example, when it is detected that the user triggers the playback control displayed in the media content playback page or detects that the user performs the preset gesture operation, the target media content may continue to be played, and the comment information of the target media content is displayed in the second region or the third region. For example, the comment information of the target media content may be displayed in a region (for example, the second region or the third region) where the comment information of the target media content is located before the playback operation is received, or the comment information of the target media content may be adjusted to the second region or the third region for display.

At S206, in response to a cancel display operation for the comment information, the display of the comment information is cancelled, and the display of the target media content is kept being paused or is continued.

The canceling display operation may be an operation for indicating to cancel displaying the comment information of the target media content, for example, an operation of triggering a closing control of the comment information, a clicking operation on the media content playback page, or a sliding operation on a predetermined position in the second region, etc.

In response to the cancel display operation for the comment information, the comment information of the target media content may be canceled, and the target media content is kept playing; or the comment information of the target inner content is canceled, and the target media content continues to be played, that is, the target media content is automatically switched from the pause playback state to the playback state.

According to the method of controlling media content provided in this embodiment, the target media content may be paused based on the target trigger operation, the comment information of the target media content may be displayed in the second region or the third region, and the continuous play of the target media content and the cancellation display of the comment information may be achieved. Thus, diversified media content control manners can be provided, different requirements of users are met, and user experience is improved.

Figure 6:
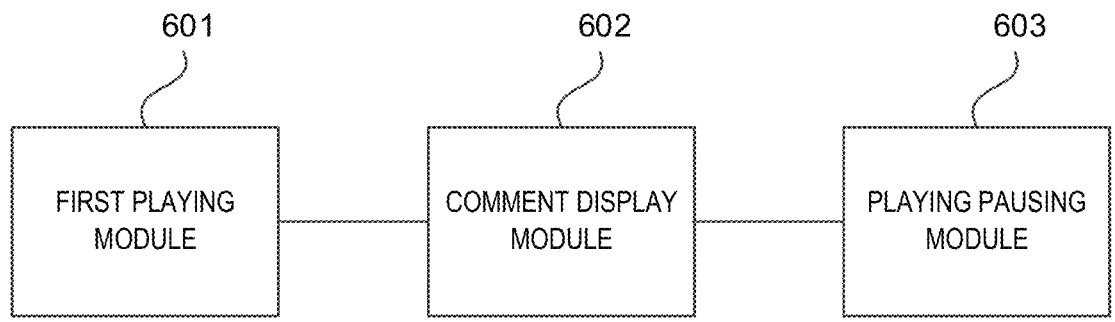
FIG. 6 is a structural block diagram of an apparatus for controlling media content according to an embodiment of the present disclosure.

FIG. 6 is a structural block diagram of an apparatus for controlling media content according to an embodiment of the present disclosure. The apparatus may be implemented by software and/or hardware, and may be configured in an electronic device, for example, may be configured in a mobile phone or a tablet computer, and may perform playing control on the media content when displaying the comment information of the media content by executing the method of controlling media content. As shown in FIG. 6, the apparatus for controlling media content provided in this embodiment may include: a first playback module 601, a comment display module 602, and a pause playback module 603. The first playback module 601 is configured to play target media content in a first region of a media content playback page; the comment display module 602 is configured to display, in response to a comment display operation for the target media content, comment information of the target media content in a second region of the media content playback page; and the pause playback module 603 is configured to, in response to a target trigger operation on the media content playback page, pause the playing of the target media content, and keep displaying the comment information of the target media content.

According to the media content control apparatus provided in this embodiment, the first playback module plays the target media content in the first region of the media content playback page; the comment display module displays, in response to a comment display operation for the target media content, comment information of the target media content in a second region of the media content playback page; and the playback module in response to a target trigger operation on the media content playback page, pauses the playing of the target media content, and keeps displaying the comment information of the target media content. By adopting the above technical solution, when the comment display operation is received in the playing process of the target media content, the comment information of the target media content is displayed and the target media content is kept displaying, and when the target trigger operation is received, the playback of the target media content is paused and the comment information of the target media content is kept displayed. Thus, the interference of the playback of the target media content to the user' viewing of the comment information of the target media content is avoided, the diversified requirements of the user in viewing the comment information are met, and the user experience is improved.

In the foregoing solution, the comment display module 602 may be further configured to: in response to the comment display operation for the target media content, display a first control in the media content playback page, where the first control is used to trigger execution of the target trigger operation.

In the foregoing solution, the first control may include a pause playback control and/or a preset adjustment control.

In the above solution, the pause playing module 603 may be configured to, in response to the target trigger operation on the pause playback control, pause the playing the target media content and display a playback control, where the playback control is used for triggering a playback operation for the target media content.

In the above solution, the pause playback module 603 may be configured to: keep displaying the comment information of the target media content in the second region; or display the comment information of the target media content in a third region, where the third region is different from the second region.

The apparatus for controlling media content provided in this embodiment may further include: a region adjustment module configured to, after keeping displaying the comment information of the target media content in the second region, in response to a region adjustment operation on the media content playback page, adjust the second region to be a third region and display the comment information of the target media content in the third region.

In the above solution, the pause playing module 603 may be configured to: in response to a region adjustment operation on the media content playback page, adjust a display region of the comment information from the second region to be a third region, and pause the playing of the target media content.

In the above solution, the pause playing module 603 may be configured to: in response to a region adjustment operation on a preset adjustment control, expand the second region to be a third region, and pause the playing of the target media content.

In the foregoing solution, the target trigger operation may include a target gesture operation, and the apparatus for controlling media content provided in this embodiment may further include: a size adjustment module configured to adjust, during triggering of the target gesture operation, a region size of the second region and/or a display size of comment information in the second region based on the target gesture operation.

In the above solution, the target gesture operation may include a target sliding operation, and the size adjustment module may be configured to adjust the region size of the second region and/or the display size of the comment information in the second region based on the sliding distance of the target sliding operation.

In the foregoing solution, the pause playback module 603 may be configured to: in response to a completion of triggering of the target trigger operation, adjust the second region to be the third region based on a preset region size of the third region, and display the comment information of the target media content in the third region based on a target display size, wherein the target display size is a first display size of the comment information before the target trigger operation is triggered, a second display size of the comment information at the completion of the triggering of the target trigger operation, or a preset third display size.

In the above solution, a second control may also be displayed in the second region, and the pause playing module 603 may be configured to: display the comment information of the target media content in the third region, and cancel displaying of the second control.

In the above solution, the information display mode of the second region and the information display mode of the third region may be different.

In the foregoing solution, a first predetermined number of pieces of first comment information and m pieces of sub-comment information of the first comment information may be displayed in the second region, and a second predetermined number of pieces of second comment information and n pieces of sub-comment information of the second comment information may be displayed in the third region, where the first predetermined number and the second predetermined number may be different, and/or m≠n, and both m and n are positive integers.

In the above solution, when being displayed in the second region and displayed in the third region, the comment information of the target media content may have different ranking orders.

The apparatus for controlling media content provided in this embodiment may further include: a first adding and displaying module configured to, after displaying the comment information of the target media content in the second region of the media content playback page, in response to a sub-comment information viewing operation in the second region, add a third predetermined number of pieces of target sub-comment information to the second region; and/or, a second adding and displaying module configured to, after displaying the comment information of the target media content in the third region, in response to a sub-comment information viewing operation in the third region, add a fourth predetermined number of pieces of target sub-comment information to the third region, where the target sub-comment information is sub-comment information of third comment information to which the sub-comment information viewing operation is directed, and the third predetermined number may be different from the fourth predetermined number.

The apparatus for controlling media content provided in this embodiment may further include: a second playing module, configured to, after the playing of the target media content is paused, continue to play the target media content in response to a playback operation for the target media content, and display the comment information of the target media content in the second region or the third region.

The apparatus for controlling media content provided in this embodiment may further include: a cancellation display module configured to, after pausing the playing of the target media content and keeping displaying the comment information of the target media content, in response to a cancel display operation for the comment information, cancel the displaying of the comment information and keep pausing playing of the target media content or continue to play the target media content.

The apparatus for controlling media content provided by the embodiments of the present disclosure may perform the method for controlling media content provided by any embodiment of the present disclosure, and has functional modules and effects corresponding to the method for controlling media content. For technical details not described in detail in this embodiment, reference may be made to the method for controlling media content provided by any embodiment of the present disclosure.

Figure 7:
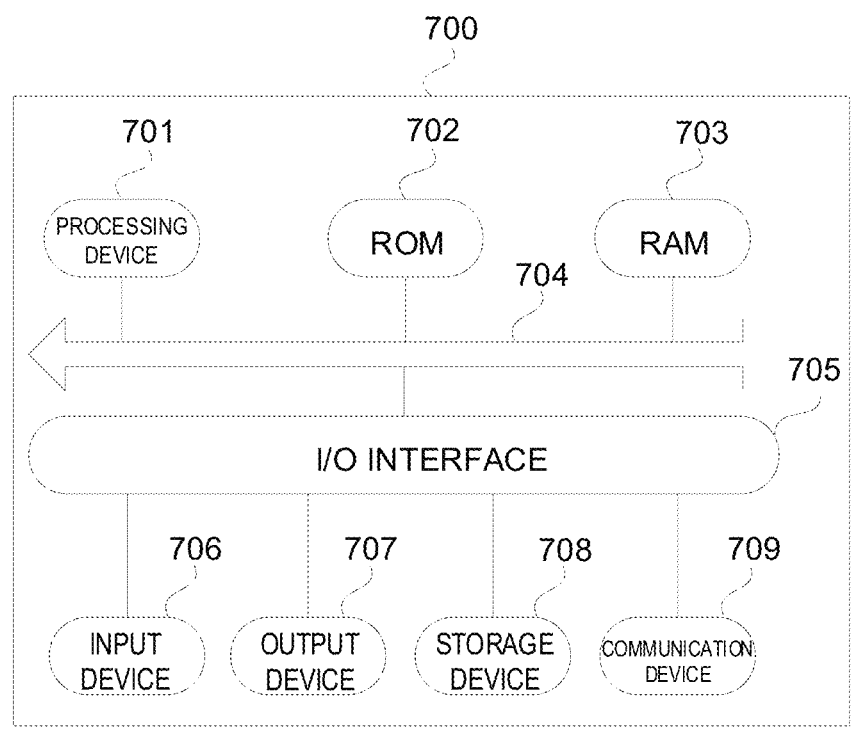
FIG. 7 is a schematic structural diagram of an electronic device according to an embodiment of the present disclosure.

FIG. 7 is a schematic structural diagram of an electronic device (for example, a terminal device) 700 suitable for implementing the embodiments of the present disclosure. The terminal device in the embodiments of the present disclosure may include a mobile terminal such as a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), and a fixed terminal such as a digital television (TV), a desktop computer, or the like. The electronic device 700 shown in FIG. 7 is merely an example, and should not impose any limitation on the functions and scope of use of the embodiments of the present disclosure.

As shown in FIG. 7, the electronic device 700 may include a processing device (for example, a central processing unit, a graphics processor, etc.) 701, which may perform various appropriate actions and processing according to a program stored in a read-only memory (ROM) 702 or a program loaded into a random access memory (RAM) 703 from a storage device 708. In the RAM 703, various programs and data required by the operation of the electronic device 700 are also stored. The processing device 701, the ROM 702, and the RAM 703 are connected to each other through a bus 704. An input/output (I/O) interface 705 is also connected to the bus 704.

Generally, the following devices may be connected to the I/O interface 705: an input device 706 including, for example, a touch screen, a touch pad, a keyboard, a mouse, a camera, a microphone, an accelerometer, a gyroscope, etc.; an output device 707 including, for example, a liquid crystal display (LCD), a speaker, a vibrator, etc.; a storage device 708 including, for example, a magnetic tape, a hard disk, etc.; and a communication device 709. The communication device 709 may allow the electronic device 700 to communicate wirelessly or wired with other devices to exchange data. Although FIG. 7 shows an electronic device 700 having multiple devices, it is not required to implement or have all the devices shown. More or fewer devices may alternatively be implemented or provided.

According to an embodiment of the present disclosure, the process described above with reference to the flowchart may be implemented as a computer software program. For example, embodiments of the present disclosure include a computer program product comprising a computer program embodied on a non-transitory computer readable medium, the computer program comprising program code for performing the method shown in the flowchart. In such embodiments, the computer program may be downloaded and installed from the network through the communication device 709, or installed from the storage device 708, or from the ROM 702, When the computer program is executed by the processing device 701, the foregoing functions defined in the method of the embodiments of the present disclosure are performed.

The computer readable medium described above may be a computer readable signal medium or a computer readable storage medium or any combination of the two. The computer-readable storage medium may be, for example, an electrical, magnetic, optical, electromagnetic, infrared, or semiconductor system, device, or device, or any combination thereof. Examples of the computer-readable storage medium may include: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer-readable storage medium may be any tangible medium containing or storing a program that may be used by or in connection with an instruction execution system, apparatus, or device. In the present disclosure, a computer readable signal medium may include a data signal propagated in baseband or as part of a carrier, where the computer readable program code is carried. Such propagated data signals may take a variety of forms, including electromagnetic signals, optical signals, or any suitable combination of the foregoing. The computer readable signal medium may also be any computer readable medium other than a computer readable storage medium that may send, propagate, or transmit a program for use by or in connection with an instruction execution system, apparatus, or device. The program code embodied on the computer-readable medium may be transmitted by any suitable medium, including wires, optical cables, Radio Frequency (RF), and the like, or any suitable combination thereof.

In some implementations, the client, server may communicate using any currently known or future developed network protocol, such as Hypertext Transfer Protocol (HTTP), and may be interconnected with any form or medium of digital data communication (e.g., a communication network). Examples of communication networks include Local Area Networks (LANs), Wide Area Networks (WANs), Internet networks (e.g., the Internet), and peer-to-peer networks (e.g., ad hoc peer-to-peer networks), as well as any currently known or future developed networks.

The computer-readable medium described above may be included in the electronic device; or may be separately present without being assembled into the electronic device.

The computer readable medium carries one or more programs, and when the one or more programs are executed by the electronic device, the electronic device is caused to: play target media content in a first region of a media content playback page; in response to a comment display operation for the target media content, display comment information of the target media content in a second region of the media content playback page; in response to a target trigger operation acting within the media content playback page, pause playing the target media content, and keep displaying comment information of the target media content.

Computer program code for performing the operations of the present disclosure may be written in one or more programming languages, including object oriented programming languages, such as Java, Smalltalk, C++, and conventional procedural programming languages, such as the "C" language or similar programming languages. The program code may execute entirely on a user computer, partially on a user computer, as a stand-alone software package, partially on a user computer, partially on a remote computer, or entirely on a remote computer or server. In the case of a remote computer, the remote computer may be connected to the user computer through any kind of network, including a LAN or WAN, or may be connected to an external computer (e.g., connected through the Internet using an Internet service provider).

The flowcharts and block diagrams in the figures illustrate architecture, functionality, and operation of possible implementations of systems, methods, and computer program products according to various embodiments of the present disclosure. In this regard, each block in the flowchart or block diagram may represent a module, program segment, or portion of code that includes one or more executable instructions for implementing the specified logical function. It should also be noted that in some alternative implementations, the functions noted in the blocks may also occur in a different order than that illustrated in the figures. For example, two consecutively represented blocks may actually be performed substantially in parallel, which may sometimes be performed in the reverse order, depending on the functionality involved. It is also noted that each block in the block diagrams and/or flowcharts, as well as combinations of blocks in the block diagrams and/or flowcharts, may be implemented with a dedicated hardware-based system that performs the specified functions or operations, or may be implemented in a combination of dedicated hardware and computer instructions.

The units involved in the embodiments of the present disclosure may be implemented in software, or may be implemented in hardware. The name of the module does not constitute a limitation on the unit itself in one case.

The functions described above may be performed, at least in part, by one or more hardware logic components. For example, without limitation, the exemplary types of hardware logic components that may be used include: a field programmable gate array (FPGA), an application specific integrated circuit (ASIC), an application specific standard (ASSP), a system on chip (SOC), a complex programming logic device (CPLD), and the like.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include electronic, magnetic, optical, electromagnetic, infrared, or semiconductor systems, devices, or devices, or any suitable combination of the foregoing. Examples of machine-readable storage media may include electrical connections based on one or more lines, portable computer diskettes, hard disks, RAMs, ROMs, EPROMs or flash memories, optical fibers, CD-ROMs, optical storage devices, magnetic storage devices, or any suitable combination of the foregoing.

According to one or more embodiments of the present disclosure, an example 1 provides a method of controlling media content, including:

playing target media content in a first region of a media content playback page;

in response to a comment display operation for the target media content, displaying comment information of the target media content in a second region of the media content playback page; and in response to a target trigger operation on the media content playback page, pausing the playing of the target media content, and/or keeping displaying the comment information of the target media content.

According to one or more embodiments of the present disclosure, an example 2 according to the method of the example 1 further includes:

in response to the comment display operation for the target media content, displaying a first control in the media content playback page, wherein the first control is used to trigger execution of the target trigger operation.

According to one or more embodiments of the present disclosure, in an example 3 according to the method of the example 2, the first control includes at least one of a pause playback control and a preset adjustment control.

According to one or more embodiments of the present disclosure, in an example 4 according to the method of the example 3, the in response to a target trigger operation on the media content playback page, pausing the playing of the target media content includes:

in response to the target trigger operation on the pause playback control, pausing the playing of the target media content and displaying a playback control, wherein the playback control is used for triggering a playback operation for the target media content.

According to one or more embodiments of the present disclosure, in an example 5 according to the method of the example 1, the keeping displaying comment information of the target media content includes:

keeping displaying the comment information of the target media content in the second region; or displaying the comment information of the target media content in a third region, wherein the third region is different from the second region.

According to one or more embodiments of the present disclosure, in an example 6 according to the method of the example 5, after the keeping displaying the comment information of the target media content in the second region, the method further includes:

in response to a region adjustment operation on the media content playback page, adjusting the second region to a third region, and displaying the comment information of the target media content in the third region.

According to one or more embodiments of the present disclosure, in an example 7 according to the method of the example 5, the in response to a target trigger operation on the media content playback page, pausing the playing of the target media content, and/or keeping displaying the comment information of the target media content includes:

in response to a region adjustment operation on the media content playback page, adjusting a display region of the comment information from the second region to the third region, and pausing the playing of the target media content.

According to one or more embodiments of the present disclosure, in an example 8 according to the method of the example 7, the in response to a region adjustment operation on the media content playback page, adjusting a display region of the comment information from the second region to the third region, and pausing the playing of the target media content includes:

in response to the region adjustment operation on a preset adjustment control, expanding the second region to be the third region, and pausing the playing of the target media content.

According to one or more embodiments of the present disclosure, in an example 9 according to the method of example 5, wherein the target trigger operation includes a target gesture operation, and the method further includes:

adjusting, during triggering of the target gesture operation, a region size of the second region and/or a display size of the comment information in the second region based on the target gesture operation.

According to one or more embodiments of the present disclosure, in an example 10 according to the method of example 9, the target gesture operation includes a target sliding operation, and the adjusting at least one of a region size of the second region and a display size of comment information in the second region based on the target gesture operation includes:

adjusting the region size of the second region and/or the display size of the comment information in the second region based on a sliding distance of the target sliding operation.

According to one or more embodiments of the present disclosure, in an example 11 according to the method of example 9, the displaying the comment information of the target media content in a third region includes:

in response to a completion of triggering of the target trigger operation, adjusting the second region to be the third region based on a preset region size of the third region, and displaying the comment information of the target media content in the third region based on a target display size, wherein the target display size is a first display size of the comment information before the target trigger operation is triggered, a second display size of the comment information at the completion of the triggering of the target trigger operation, or a preset third display size.

According to one or more embodiments of the present disclosure, in an example 12 according to the method of example 5, a second control is further displayed in the second region, and the displaying the comment information of the target media content in a third region includes:

displaying the comment information of the target media content in the third region, and canceling displaying of the second control.

According to one or more embodiments of the present disclosure, in an example 13 according to the method of example 5, an information display mode of the second region is different from an information display mode of the third region.

According to one or more embodiments of the present disclosure, in an example 14 according to the method of example 13, a first predetermined number of pieces of first comment information and m pieces of sub-comment information of the first comment information are displayed in the second region, and a second predetermined number of pieces of second comment information and n pieces of sub-comment information of the second comment information are displayed in the third region, and the first predetermined number is different from the second predetermined number, and/or m≠n, wherein m and n are positive integers.

According to one or more embodiments of the present disclosure, in an example 15 according to the method of example 13, ranking orders of the comment information of the target media content are different with respect to displaying in the second region and displaying in the third region.

According to one or more embodiments of the present disclosure, in an example 16 according to the method of example 5, after the displaying the comment information of the target media content in the second region of the media content playback page, the method further includes:

in response to a sub-comment information viewing operation in the second region, adding a third predetermined number of pieces of target sub-comment information to the second region; and/or after the displaying the comment information of the target media content in the third region, the method further includes:

in response to a sub-comment information viewing operation in the third region, adding a fourth predetermined number of pieces of target sub-comment information to the third region;

wherein the target sub-comment information is sub-comment information of third comment information to which the sub-comment information viewing operation is directed, and the third predetermined number is different from the fourth predetermined number.

According to one or more embodiments of the present disclosure, in an example 17 according to any of the method of examples 1 to 16, after pausing the playing of the target media content, the method further includes:

in response to a playback operation for the target media content, continuing the playing of the target media content, and displaying the comment information of the target media content in the second region or a third region.

According to one or more embodiments of the present disclosure, in an example 18 according to any of the method of examples 1 to 16, after the pausing the playing of the target media content and/or keeping displaying the comment information of the target media content, the method further includes:

in response to a cancel display operation for the comment information, canceling the displaying of the comment information, and keeping pausing the playing of the target media content.

According to one or more embodiments of the present disclosure, an example 19 provides an apparatus for controlling media content including:

a first playing module configured to play target media content in a first region of a media content playback page;

a comment display module configured to display, in response to a comment display operation for the target media content, comment information of the target media content in a second region of the media content playback page; and a playing pausing module configured to, in response to a target trigger operation on the media content playback page, pause the playing of the target media content, and keep displaying the comment information of the target media content.

According to one or more embodiments of the present disclosure, an example 20 provides an electronic device, including:

at least one processor; and a memory communicatively connected to the at least one processor, wherein the memory stores a computer program executable by the at least one processor, and the computer program is executed by the at least one processor to enable the at least one processor to perform the method of controlling media content according to any of examples 1 to 18.

According to one or more embodiments of the present disclosure, an example 21 provides a computer-readable storage medium having stored thereon a computer program, the program, when executed by a processor, implements the method of controlling media content according to any of examples 1 to 18.

According to one or more embodiments of the present disclosure, an example 22 provides a computer program product, including a computer program carried on a non-transitory computer readable medium, where the computer program includes program code for performing the method of controlling media content according to any of examples 1 to 18.

Further, while multiple operations are depicted in a particular order, this should not be understood to require that these operations be performed in the particular order shown or in sequential order. In certain circumstances, multitasking and parallel processing may be advantageous. Likewise, while multiple implementation details are included in the discussion above, these should not be construed as limiting the scope of the present disclosure. Some features described in the context of separate embodiments may also be implemented in combination in a single embodiment. Conversely, the various features described in the context of a single embodiment may also be implemented in multiple embodiments either individually or in any suitable sub-combination.

We claim:

1. A method of displaying media content, comprising:
playing target media content in a first region of a media content playback page;
in response to a comment display operation for the target media content, displaying comment information of the target media content in a second region of the media content playback page; and
in response to a target trigger operation on the media content playback page, pausing the playing of the target media content, and keeping displaying the comment information of the target media content,
wherein the target trigger operation comprises a target gesture operation, and keeping displaying the comment information of the target media content comprises:
keeping displaying the comment information of the target media content in the second region, wherein the target gesture operation comprises a target sliding operation, and during triggering of the target gesture operation, at least one of a region size of the second region and a display size of the comment information in the second region are adjusted based on a sliding distance of the target sliding operation; or
displaying the comment information of the target media content in a third region, wherein the third region is different from the second region.

2. The method of claim 1, further comprising:
in response to the comment display operation for the target media content, displaying a first control in the media content playback page, wherein the first control is configured to trigger the target trigger operation.

3. The method of claim 2, wherein the first control comprises at least one of a pause playback control and a preset adjustment control.

4. The method of claim 3, wherein the in response to a target trigger operation on the media content playback page, pausing the playing of the target media content comprises:
in response to the target trigger operation on the pause playback control, pausing the playing of the target media content and displaying a playback control, wherein the playback control is configured for triggering a playback operation for the target media content.

5. The method of claim 1, wherein the in response to a target trigger operation on the media content playback page, pausing the playing of the target media content, and keeping displaying the comment information of the target media content comprises:
in response to a region adjustment operation on the media content playback page, adjusting a display region of the comment information from the second region to be the third region, and pausing the playing of the target media content.

6. The method of claim 5, wherein the in response to a region adjustment operation on the media content playback page, adjusting a display region of the comment information from the second region to the third region, and pausing the playing of the target media content comprises:
in response to the region adjustment operation on a preset adjustment control, expanding the second region to be the third region, and pausing the playing of the target media content.

7. The method of claim 1, wherein the displaying the comment information of the target media content in a third region comprises:
in response to a completion of triggering of the target trigger operation, adjusting the second region to be the third region based on a preset region size of the third region, and displaying the comment information of the target media content in the third region based on a target display size, wherein the target display size is a first display size of the comment information before the target trigger operation is triggered, a second display size of the comment information at the completion of the triggering of the target trigger operation, or a preset third display size.

8. The method of claim 1, wherein a second control is further displayed in the second region, and the displaying the comment information of the target media content in a third region comprises:
displaying the comment information of the target media content in the third region, and canceling displaying of the second control.

9. The method of claim 1, wherein an information display mode of the second region is different from an information display mode of the third region.

10. The method of claim 9, wherein a first predetermined number of pieces of first comment information and m pieces of sub-comment information of the first comment information are displayed in the second region, and a second predetermined number of pieces of second comment information and n pieces of sub-comment information of the second comment information are displayed in the third region, and wherein at least one of the following is satisfied:
the first predetermined number is different from the second predetermined number; and
m≠n, wherein m and n are positive integers.

11. The method of claim 9, wherein a ranking order of the comment information of the target media content displayed in the second region is different from a ranking order of the comment information of the target media content displayed in the third region.

12. The method of claim 1, wherein at least one of the following is satisfied:
after the displaying the comment information of the target media content in the second region of the media content playback page, the method further comprises: in response to a sub-comment information viewing operation in the second region, adding a third predetermined number of pieces of target sub-comment information to the second region;
after the displaying the comment information of the target media content in the third region, the method further comprises: in response to a sub-comment information viewing operation in the third region, adding a fourth predetermined number of pieces of target sub-comment information to the third region,
wherein the target sub-comment information is sub-comment information of third comment information to which the sub-comment information viewing operation is directed, and the third predetermined number is different from the fourth predetermined number.

13. The method of claim 1, wherein after pausing the playing of the target media content, the method further comprises:
in response to a playback operation for the target media content, continuing the playing of the target media content, and displaying the comment information of the target media content in the second region or a third region.

14. The method of claim 1, wherein after the pausing the playing of the target media content and/or keeping displaying the comment information of the target media content, the method further comprises:
in response to a cancel display operation for the comment information, canceling the displaying of the comment information, and keeping pausing the playing of the target media content.

15. An electronic device, comprising:
at least one processor; and
a memory communicatively connected to the at least one processor, wherein the memory stores a computer program executable by the at least one processor, and the computer program is executed by the at least one processor to enable the at least one processor to perform acts comprising:
playing target media content in a first region of a media content playback page;
in response to a comment display operation for the target media content, displaying comment information of the target media content in a second region of the media content playback page; and
in response to a target trigger operation on the media content playback page, pausing the playing of the target media content, and keeping displaying the comment information of the target media content,
wherein the target trigger operation comprises a target gesture operation, and keeping displaying the comment information of the target media content comprises:
keeping displaying the comment information of the target media content in the second region, wherein the target gesture operation comprises a target sliding operation, and during triggering of the target gesture operation, at least one of a region size of the second region and a display size of the comment information in the second region are adjusted based on a sliding distance of the target sliding operation; or
displaying the comment information of the target media content in a third region, wherein the third region is different from the second region.

16. A non-transitory computer-readable storage medium storing computer instructions, wherein the computer instructions, when executed by a processor, implement acts comprising:
playing target media content in a first region of a media content playback page;
in response to a comment display operation for the target media content, displaying comment information of the target media content in a second region of the media content playback page; and
in response to a target trigger operation on the media content playback page, pausing the playing of the target media content, and keeping displaying the comment information of the target media content,
wherein the target trigger operation comprises a target gesture operation, and keeping displaying the comment information of the target media content comprises:
keeping displaying the comment information of the target media content in the second region, wherein the target gesture operation comprises a target sliding operation, and during triggering of the target gesture operation, at least one of a region size of the second region and a display size of the comment information in the second region are adjusted based on a sliding distance of the target sliding operation; or
displaying the comment information of the target media content in a third region, wherein the third region is different from the second region.

17. The method of claim 1, wherein after keeping displaying the comment information of the target media content in the second region, the method further comprises:
in response to a region adjustment operation on the media content playback page, adjusting the second region to be a third region, and displaying the comment information of the target media content in the third region.

* * * * *